Oct. 6, 1959 L. E. PUGSLEY 2,907,077
CAMPING ASSEMBLY
Filed April 9, 1958 11 Sheets-Sheet 3
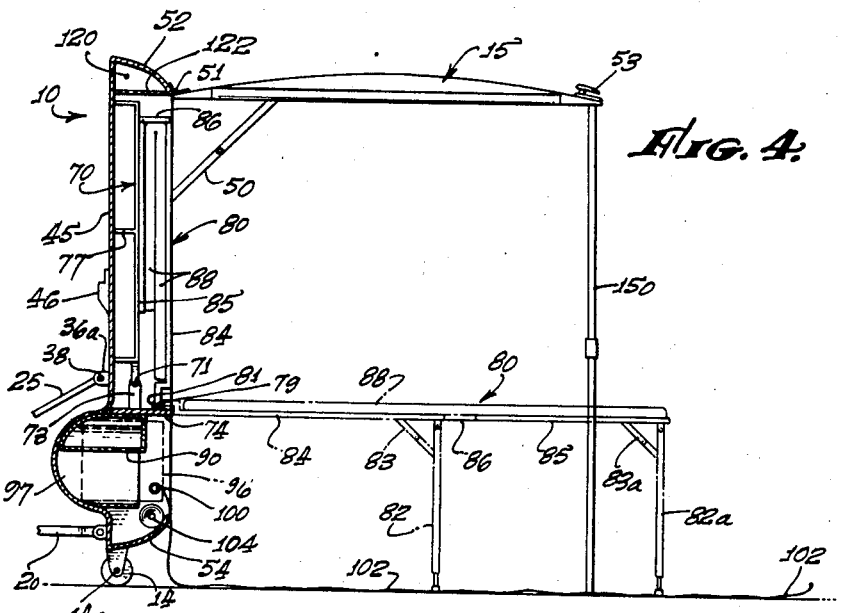
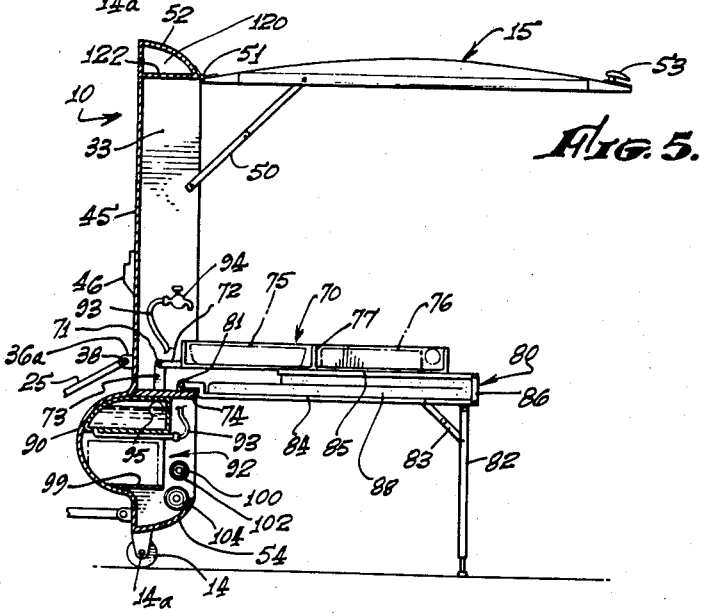
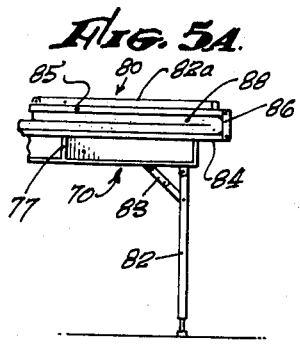
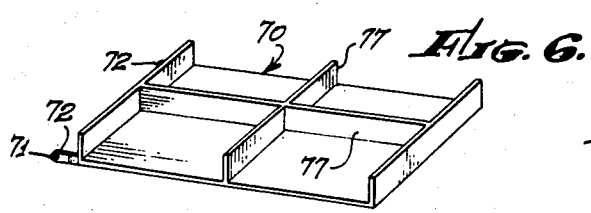
LAWRENCE E. PUGSLEY,
INVENTOR.
BY HIS ATTORNEYS
HARRIS, KIECH, FOSTER & HARRIS.

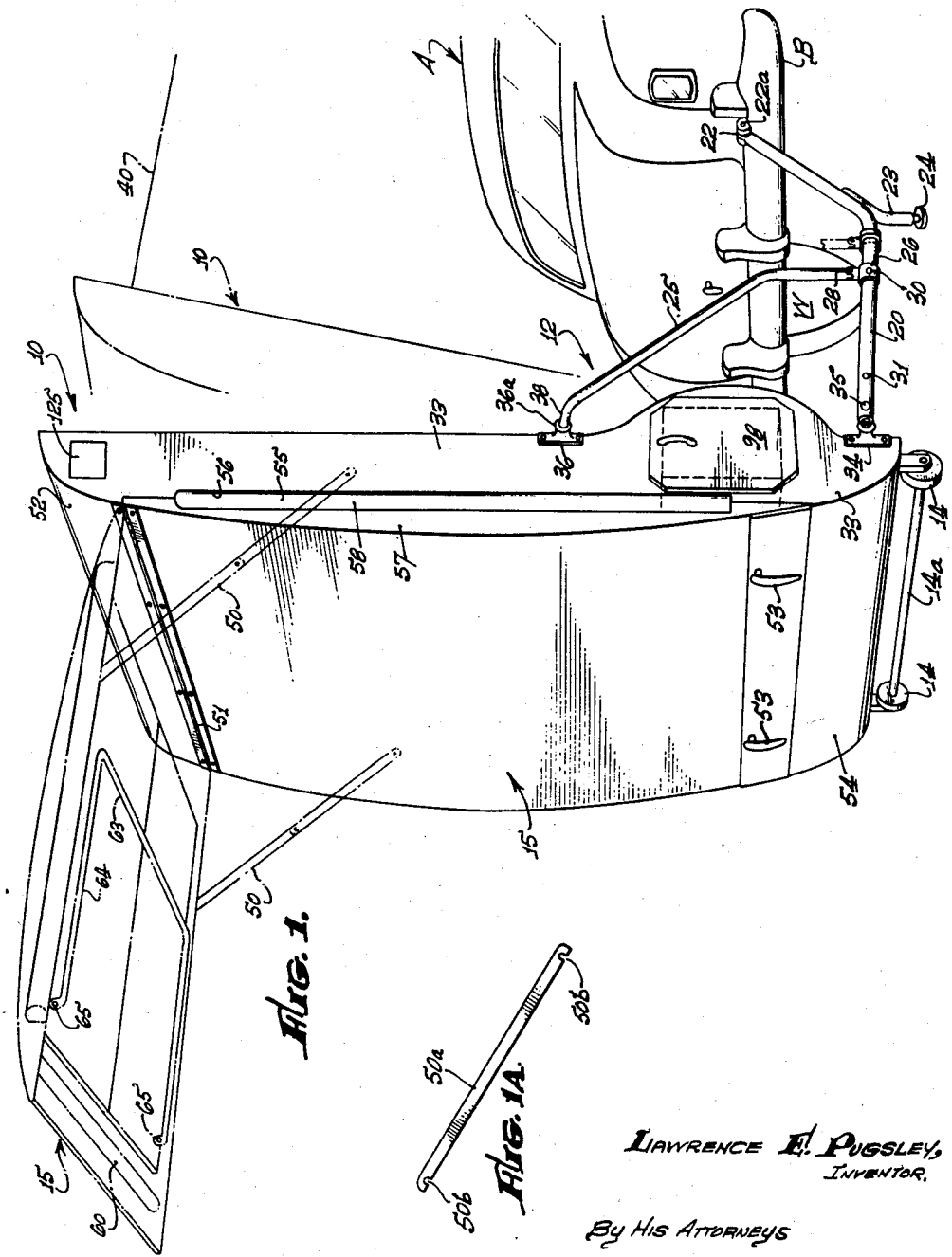

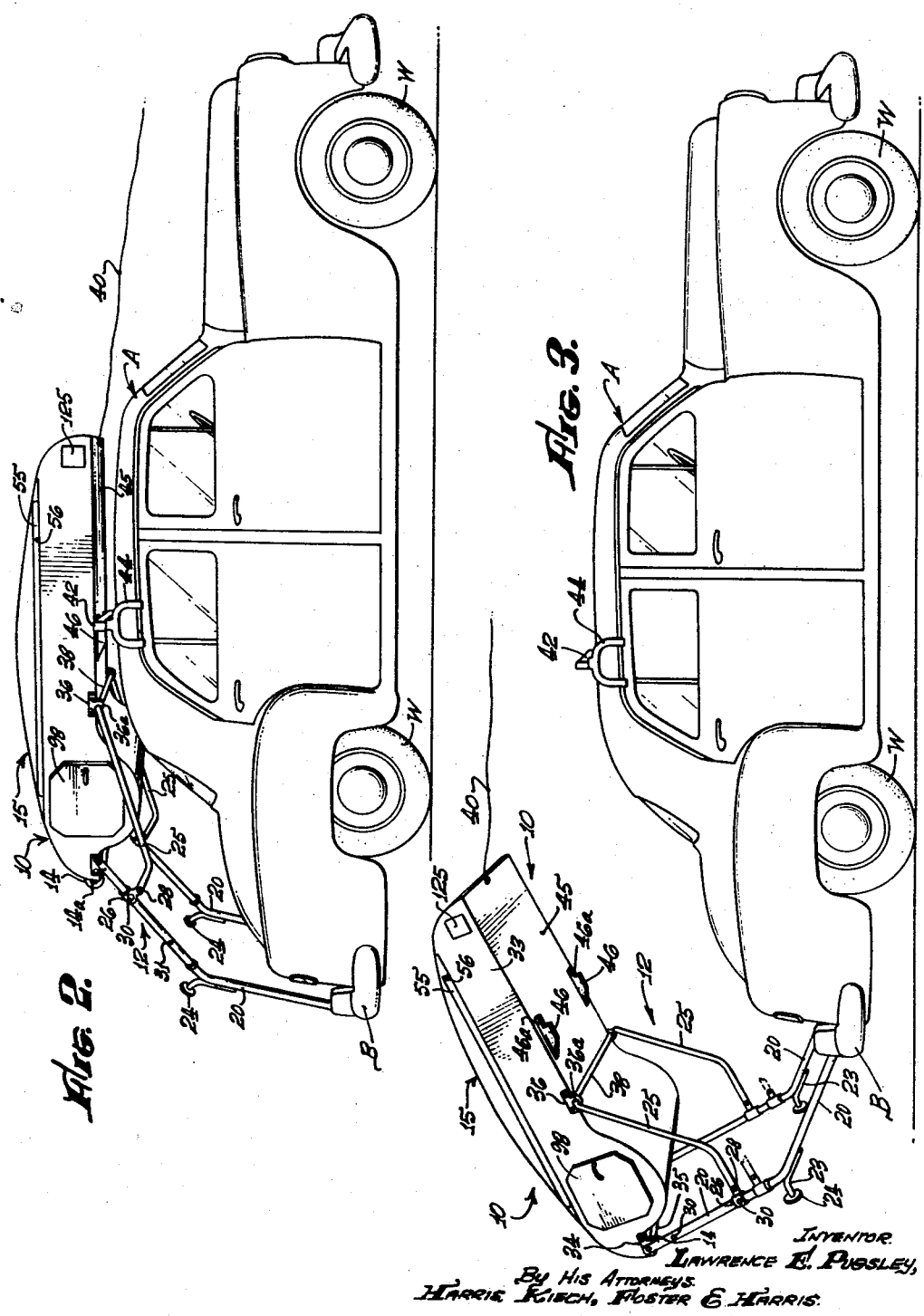

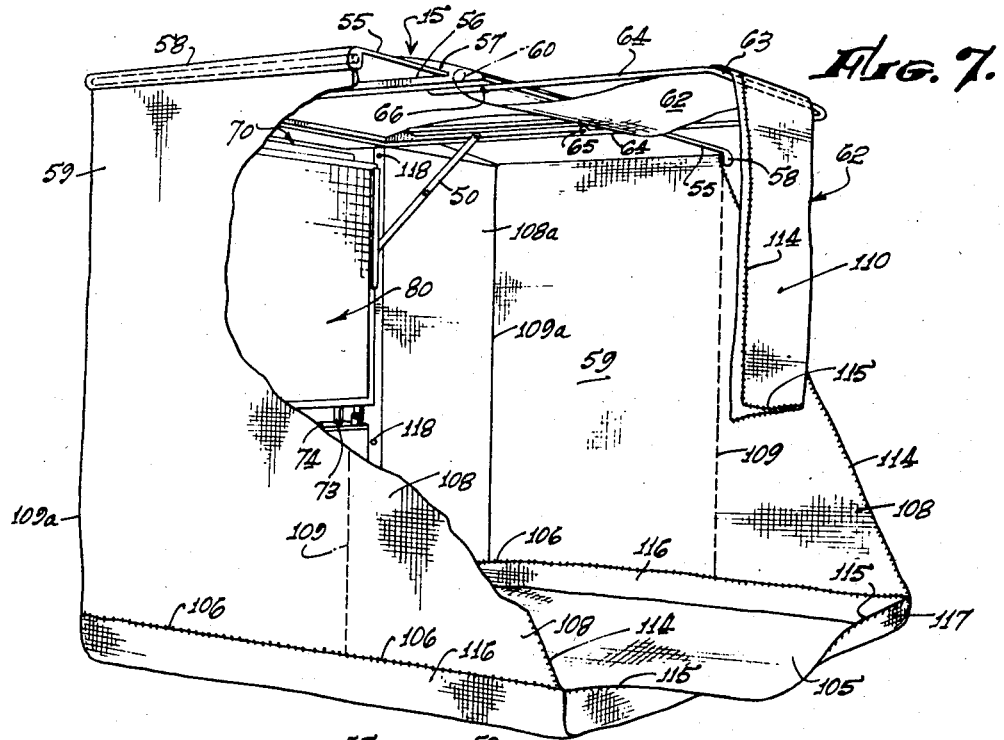
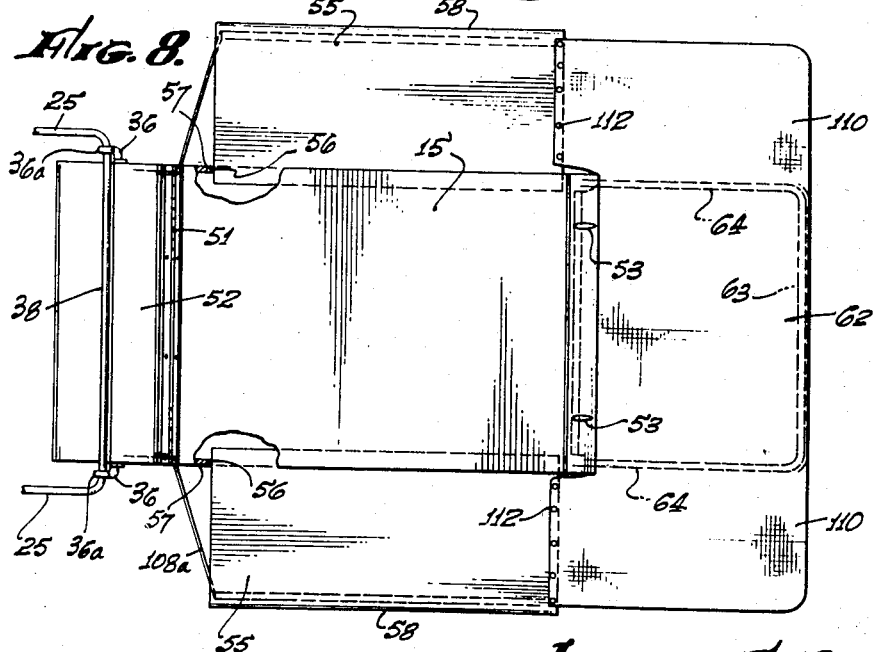

Oct. 6, 1959 L. E. PUGSLEY 2,907,077
CAMPING ASSEMBLY
Filed April 9, 1958 11 Sheets-Sheet 5
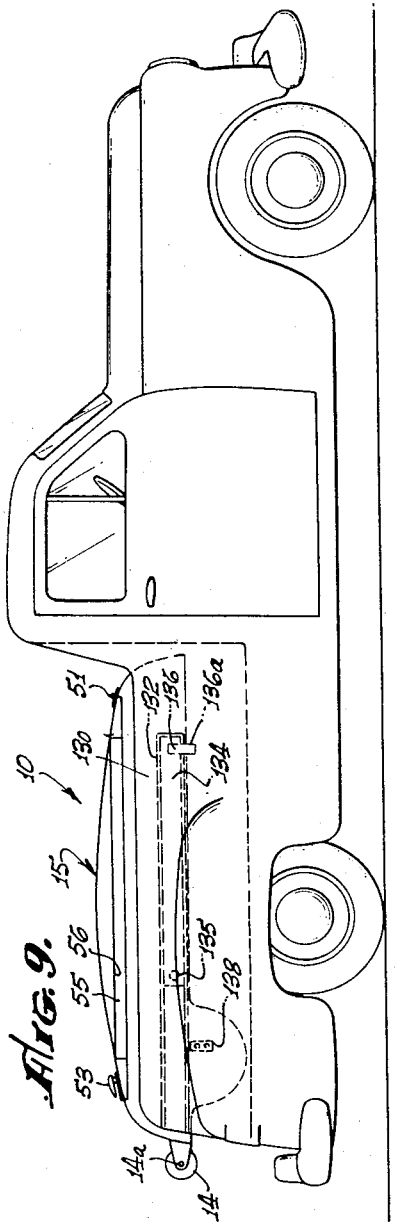
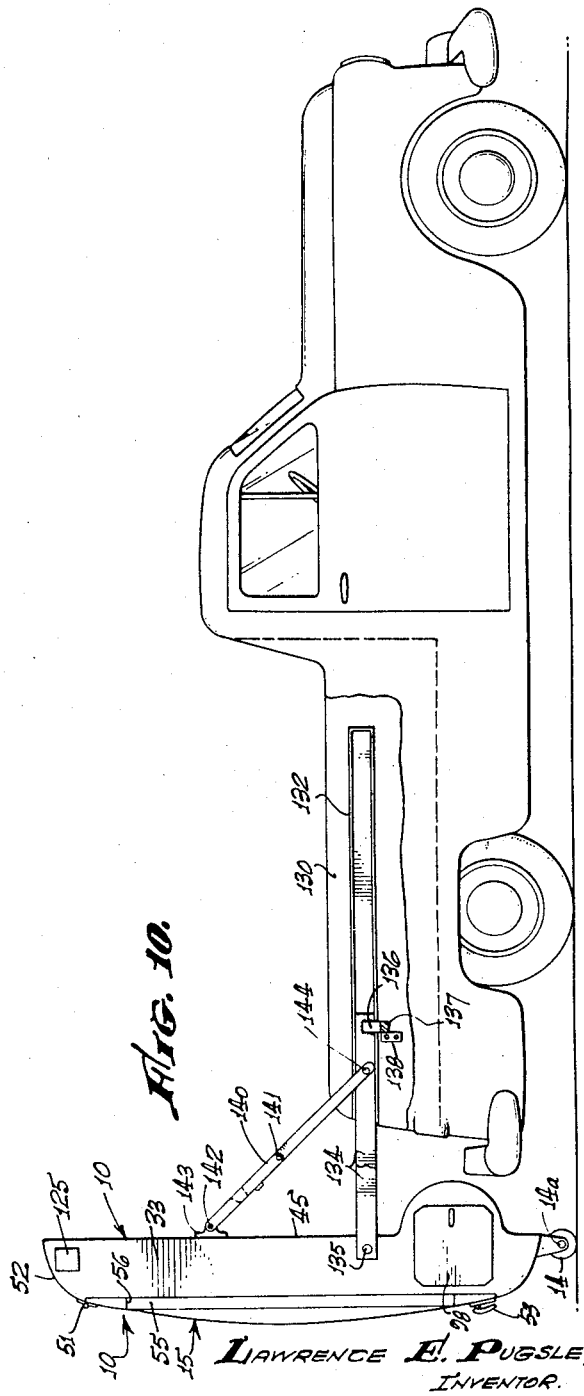
Lawrence E. Pugsley,
INVENTOR.
By His Attorneys
Harris, Kiech, Foster & Harris.

Oct. 6, 1959 L. E. PUGSLEY 2,907,077
CAMPING ASSEMBLY
Filed April 9, 1958 11 Sheets-Sheet 6
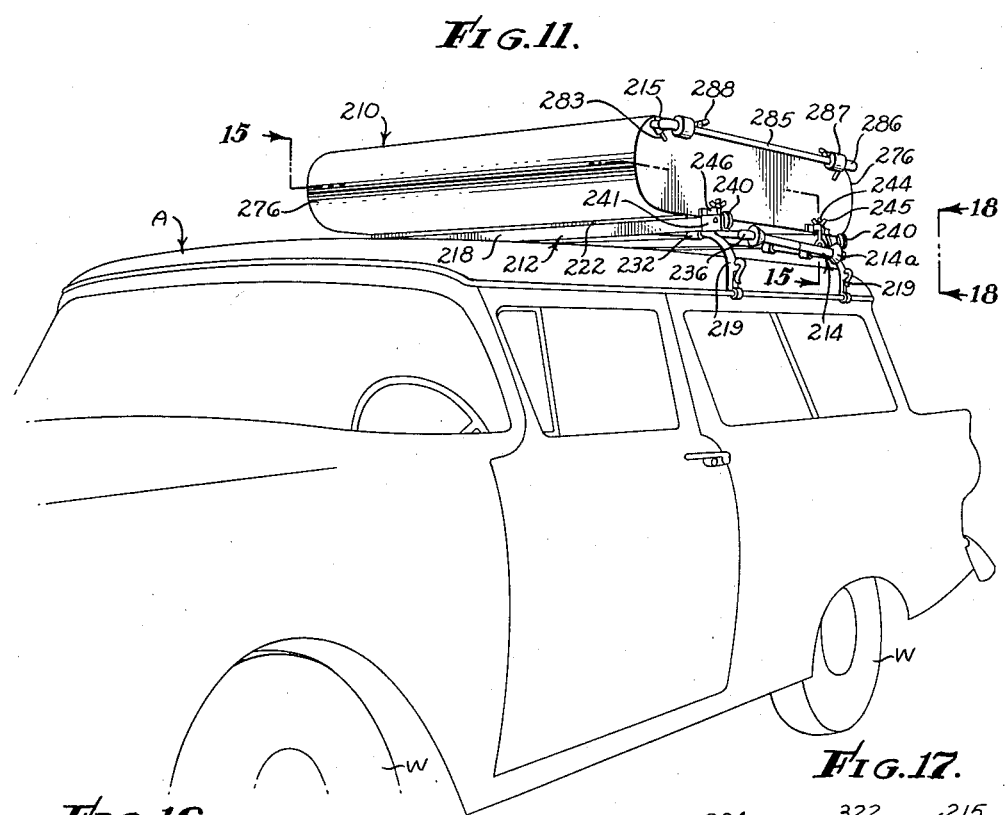
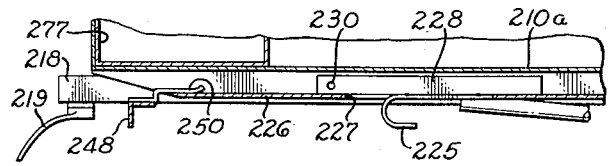
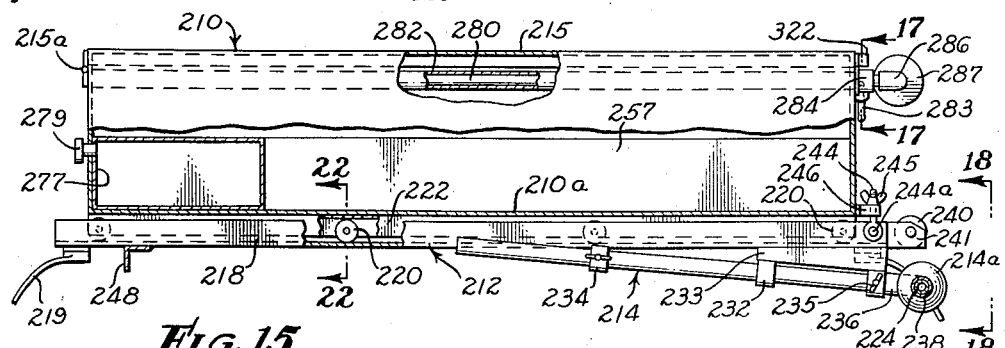
INVENTOR.
LAWRENCE E. PUGSLEY
BY HIS ATTORNEYS.
HARRIS, KIECH, FOSTER & HARRIS Oct. 6, 1959 — L. E. PUGSLEY — 2,907,077
CAMPING ASSEMBLY
Filed April 9, 1958 — 11 Sheets-Sheet 7
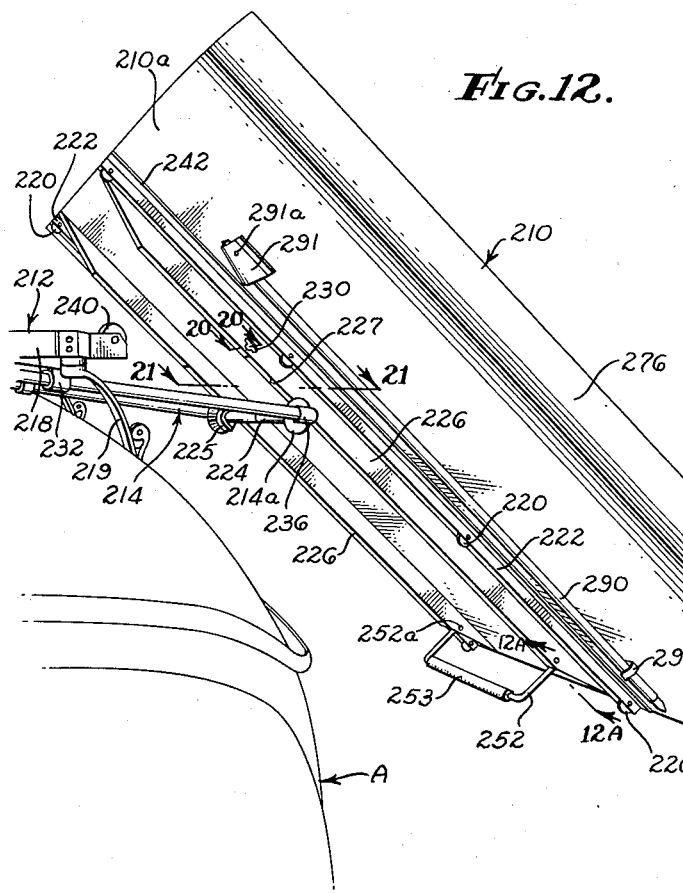
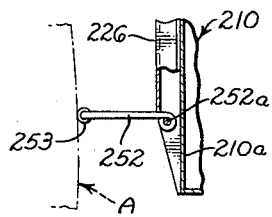
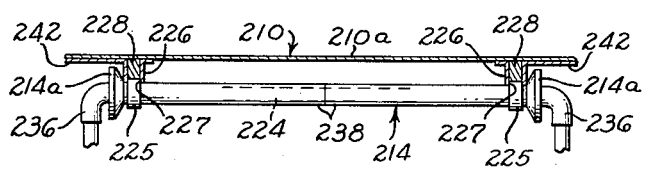
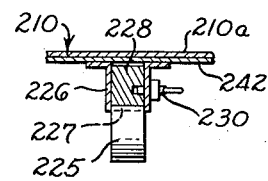
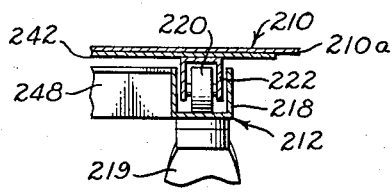
INVENTOR.
LAWRENCE E. PUGSLEY
BY HIS ATTORNEYS.
HARRIS, KIECH, FOSTER & HARRIS Oct. 6, 1959     L. E. PUGSLEY     2,907,077
CAMPING ASSEMBLY Filed April 9, 1958     11 Sheets-Sheet 8

INVENTOR.
LAWRENCE E. PUGSLEY

BY HIS ATTORNEYS.
HARRIS, KIECH, FOSTER & HARRIS

Oct. 6, 1959  L. E. PUGSLEY  2,907,077
CAMPING ASSEMBLY
Filed April 9, 1958  11 Sheets-Sheet 9
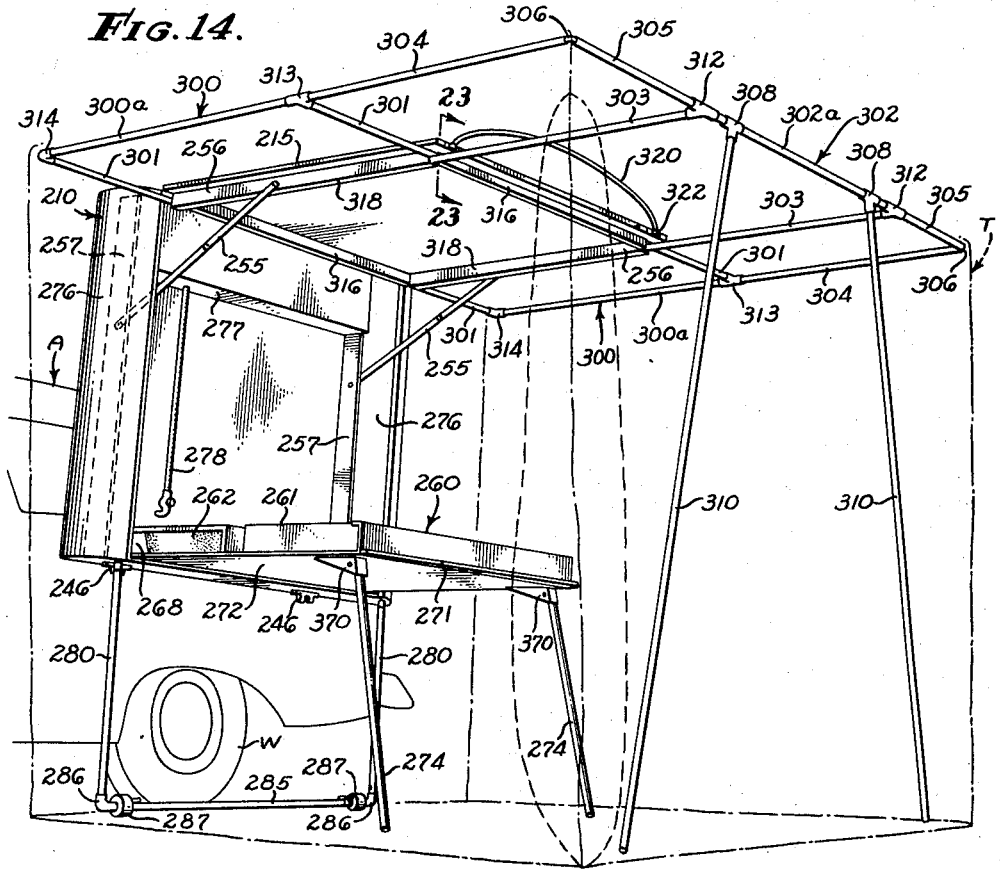
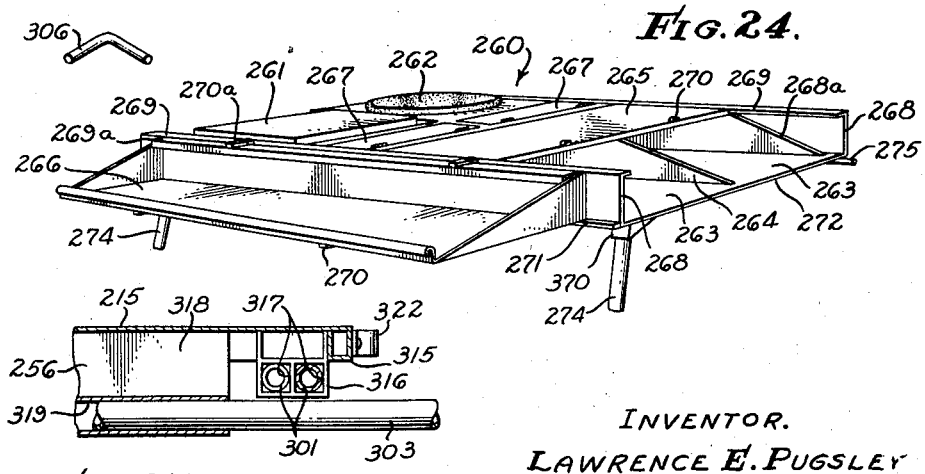
INVENTOR.
LAWRENCE E. PUGSLEY
BY HIS ATTORNEYS.
HARRIS, KIECH, FOSTER & HARRIS Oct. 6, 1959 — L. E. PUGSLEY — 2,907,077
CAMPING ASSEMBLY
Filed April 9, 1958 — 11 Sheets-Sheet 10

INVENTOR.
LAWRENCE E. PUGSLEY

BY HIS ATTORNEYS.
HARRIS, KIECH, FOSTER & HARRIS

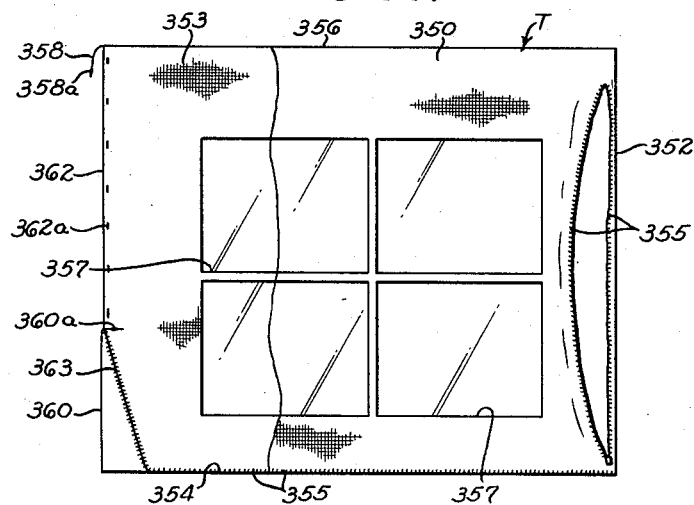
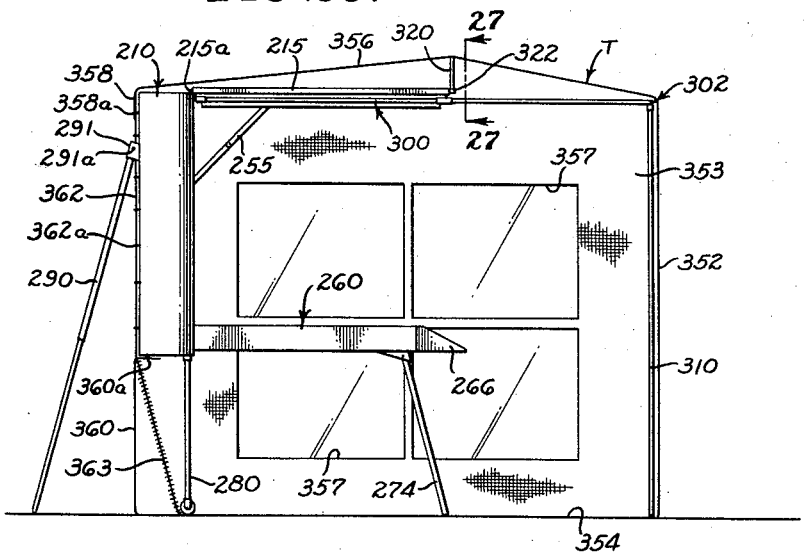
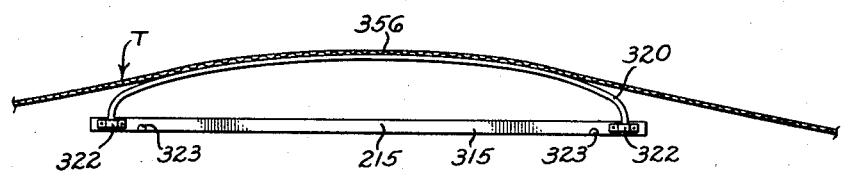

United States Patent Office 2,907,077
Patented Oct. 6, 1959

2,907,077

CAMPING ASSEMBLY

Lawrence E. Pugsley, Hermosa Beach, Calif.

Application April 9, 1958, Serial No. 727,491

36 Claims. (Cl. 20—2)

This invention relates to camping equipment for attachment to automobiles, and more especially to equipment which may be moved between a transport position on an automobile body and a set-up operating position on a camping site adjacent the automobile. This application is a continuation-in-part of my earlier application, Serial No. 680,062, filed August 26, 1957.

It is an object of the invention to provide a camping assembly and a carrier therefor such that the assembly may be formed as a unit to be swung into an elevated position on an automobile when folded or closed and to be lowered into a grounded open or unfolded operative position without the necessity of removing the assembly from the automobile.

It is also an object of the invention to provide and mount on an automobile an assembly which itself contains full camping equipment, which is easily and quickly movable into camping position, and which is easily and quickly returnable to transport position.

Additionally, an object is to provide such a camping outfit, which, when set up for use, may be disconnected from the automobile and left standing for occupancy independently of the automobile which carried it.

Essential objects and features of the invention involve proper mounting and balancing of the whole assembly with respect to a carrier automobile, and also the relationship and mounting of various camping facilities in a housing of the assembly so that they balance well from the standpoint of a person lowering or raising the unit and from the standpoint of the carrier and its mounting, and are arranged from the standpoint of the utmost in co-operation in their use, storage and transport.

Other objects and various features of the invention will become apparent to those skilled in the camping equipment art and in travelling and camping upon reference to the following specification and the accompanying drawings wherein:

Fig. 1 is a perspective view showing one form of housing structure, which contains various camping facilities, lowered from the top of an automobile to a position in the rear thereof and arranged in an upright position where it is ready either to be opened up for camping purposes or to be pushed or pulled toward the broken line position for moving to transport position on top of the automobile;

Fig. 1A is a detail;

Fig. 2 is a view partly in perspective showing the structure of Fig. 1 mounted in transport position on top of the mentioned automobile;

Fig. 3 is a view similar to that of Fig. 2 showing the mentioned housing in an intermediate position where it is being either lowered to operatve camping position or raised to transport position;

Fig. 4 is in part a side elevation and in part a vertical section of the camping unit represented by the mentioned vertical housing and showing the cover of the housing elevated to serve as a roof, a folding bed, a folding table and other facilities being indicated, the folding bed being further indicated in broken lines extended to its operative position;

Fig. 5 is a view similar to that of Fig. 4 with the mentioned bed and table arranged in position for use of the table;

Fig. 5A shows a variation;

Fig. 6 is a perspective view of the table detached from the housing;

Fig. 7 is a perspective view showing a tent located in operative position;

Fig. 8 is a top plan view of the structure shown in Fig. 7;

Fig. 9 is a side elevation showing the mounting of the housing assembly of Figs. 1, 2 and 3 upon a pick-up truck;

Fig. 10 is a side elevation showing the structure of Fig. 9 in set-up vertical position ready for opening to set up a camp;

Fig. 11 is a perspective view of a form of this invention mounted on an automobile top for lowering to a position at the left side of the automobile, the box-like housing being shorter than with the other forms, whereby to accommodate itself to a transverse unloading position;

Fig. 12 is a perspective view illustrating the housing of Fig. 11 being lowered toward an upright position;

Fig. 12A is an elevational detail on line 12A—12A of Fig. 12;

Fig. 14 is a perspective view of the structure of Figs. 11, 12 and 13 in upright operating position, its lid elevated to act as a roof, its galley table lowered to operating position, and a series of telescoping frames extended to support an envelope type tent indicated in position by broken lines;

Fig. 14A is a detail of a connecting L plug used in Fig. 14;

Fig. 15 is an enlarged scale view largely in longitudinal vertical section and taken approximately on the line 15—15 of Fig. 11;

Fig. 16 is a fragmentary similar section;

Fig. 17 is principally an elevational detail indicated by the line 17—17 of Fig. 15;

Figure 13:
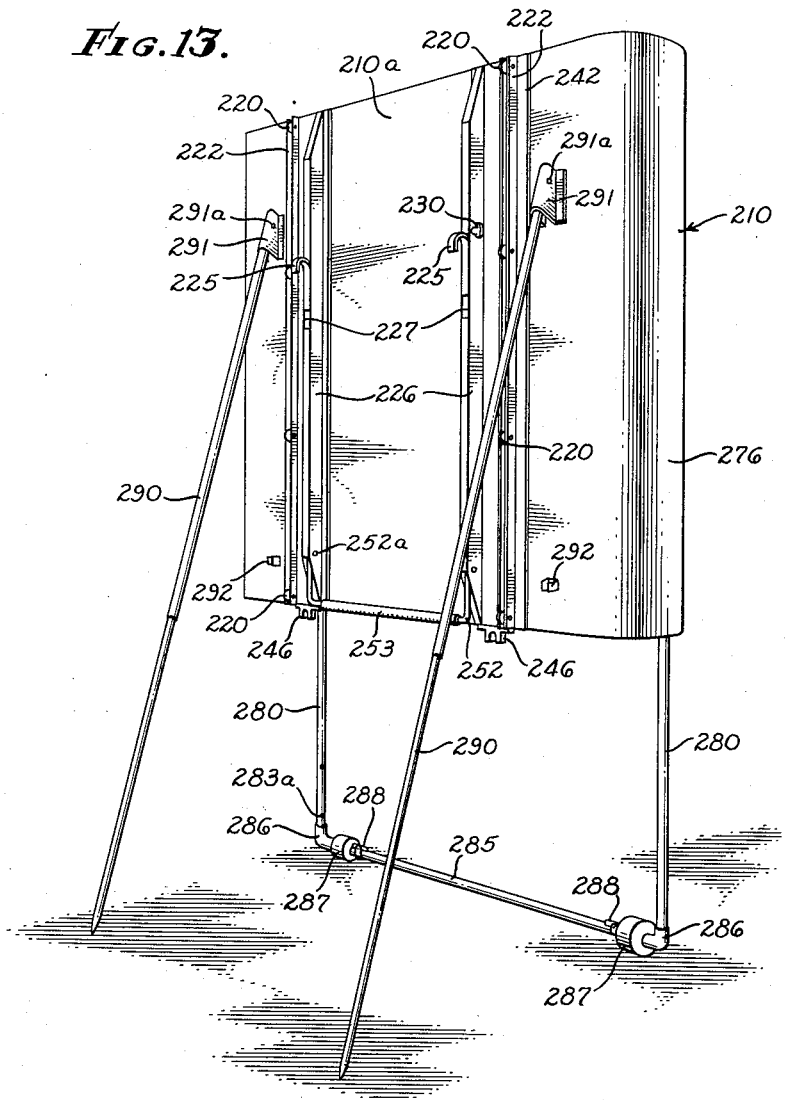
Fig. 13 is a perspective view of the housing in upright operative position, or storage position, and disconnected from the automobile so that the latter may be used for other purposes.

Figs. 20 and 21 are sectional details taken respectively on the lines 20—20 and 21—21 of Fig. 12;

Fig. 22 is a sectional detail taken on the line 22—22 of Fig. 15;

Fig. 23 is an enlarged sectional detail taken on the line 23—23 of Fig. 14;

Fig. 24 is a perspective view of a galley table adapted to be swung out from within the housing, but here shown as disconnected from the housing;

Fig. 25 is principally a side elevation of a set-up tent, all supporting structures, however, being omitted;

Fig. 26 is a vertical section through the erected tent mounted upon its supports; and Fig. 27 is an elevational detail taken from the line 27—27 of Fig. 26.

The structure illustrated in Figs. 1, 2 and 3 includes a conventional automobile body A having the usual top and upstanding front, rear and lateral side walls, wheels W and any standard type of rear bumper B serving as a support for the camping assembly and mounting structure of this form of the invention. The camping assembly includes an elongated box-like housing 10 connected with a carrier or rack structure 12, and adapted to be moved thereby between the camping position of Fig. 1 and the transport position of Fig. 2.

The elongated housing 10 is preferably provided with a pair of ground wheels 14 or the like carried on a suitable axle 14a at one end of the housing, which is the lower end when the structure is in camping position and the rearward end when the structure is in transport position. The housing also has a door or cover 15 hingedly mounted at its upper end when in the operating position of Fig. 1 so that it may be swung to the broken-line position to serve as a tent top or roof.

The particular carrier 12 illustrated includes two elongated main supporting side arms 20 which are ordinarily bent into the angular configuration illustrated. As seen in Fig. 1, the forward end of each side arm 20 is mounted on the rear bumper B by a separable hinge 22, that is, a hinge which may have a removable pin such as indicated at 22a so that the carrier 12 connected to the housing 10 may be disconnected from the automobile and left standing in a camp location. Especially to render such disconnected carrier and housing a self-supported unit, the forward portion of each arm 20 is provided with a rigidly mounted depending leg 23 and a ground-engaging foot 24. The rearward portion of each main side arm 20 has slidably connected therewith a bracing and positioning arm 25. Such connection is preferably a sliding connection effected through the medium of a sliding sleeve 26 to which the adjacent end of the positioning arm 25 is pivotally connected at 28. Desirably, each sliding sleeve 26 is provided with a locking or latch pin 30 adapted to pass through holes in the sleeve and through holes 31 in rearward portions of the main side arms 20 so that each sliding sleeve 26 may be locked on its main arm 20 when in either the position of Fig. 1 or the position of Fig. 2 when desired. As seen in Fig. 1, the rearward extremity of each main arm 20 is pivotally connected to the lower end of the respective side wall 33 of the housing 10 through the medium of a bracket 34 secured to the housing 10. Such pivotal mounting, as seen in Fig. 3, may include a pivoting crossbar 35 journalled in the brackets 34 and extending into the main side arms 20. The extremities of the positioning arms 25 opposite from their sliding sleeves 26 are pivotally connected to an intermediate portion of the housing 10 through the medium of brackets 36 secured to the adjacent side walls 33 of the housing 10 and, as illustrated, this is effected through the medium of a pivoting crossbar 38 integral with the positioning arms 25, the brackets 36 having eyes 36a pivotally receiving the ends of the crossbar 38.

As presently to be more fully described, the housing 10 containing various camping facilities may be easily swung between the operative camping position of Fig. 1 and the transport position of Fig. 2, the assembled unit including the housing 10 and the carrier structure 12 being passed through the position of Fig. 3 in either direction. If desired, a rope or cable 40 may be attached to the swinging end of the housing 10 to facilitate lowering thereof from the position of Fig. 2 or return thereof from the position of Fig. 1. When the housing 10 is moved to the transport position of Fig. 2, an intermediate portion thereof rests upon a frame or rest or supporting crossbar 42 (which may be of wood or metal and padded if desired) attached to the sides of the automobile body A by any known or preferred rain gutter clamp or other type of clamping means such as indicated at 44. A back wall 45 of the housing 10 at the mentioned intermediate position is provided with a laterally spaced pair of rests and stop blocks 46 notched at their forward ends as indicated so that the forward shallow end portions rest upon the mentioned padded crossbar 42 and forwardly directed shoulder portions 46a bear against the back of the crossbar 42 to serve as stops. Any appropriate locking or stabilizing means may be employed for the structure when in the transport position of Fig. 2. This may desirably be effected through the medium of the sliding sleeves 26 at the lower ends of the bracing or positioning arms 25. Thus, the latch pin 30 carried by each sleeve 26 may be passed through corresponding holes 31 at the ends of the main side arms 20 to lock the sleeves 26 against sliding movement on such arms 20.

The camping equipment illustrated in Figs. 4 to 8 is all contained in the housing 10 and is accessible when the latter is in the position of Fig. 1. Thus, by raising the door or cover 15 to the broken-line position indicated in Fig. 1 and locking it in such position by conventional jointed bracing arms 50 or jack-knife brace as in Figs. 4 and 5, the cover 15 becomes a roof or top for a tent, as indicated in Fig. 7. For the purpose of conveniently manipulating the cover 15, the upper end thereof is connected by a long piano hinge 51 to an outwardly facing upper wall portion 52 of the housing 10. The indicated raising motion of the cover 15 is easily accomplished through the medium of handles 53 at the lower end of the cover as viewed in Fig. 1, such handles 53 being conveniently and conventionally connected with any type of inner latch means co-operating with conventional companion latch means carried by an outwardly facing lower wall portion 54 of the housing 10.

The roof or canopy provided by the elevated top or cover 15 may be further extended laterally by a slidable roof extension 55 at each side of the top 15. Each extension 55 is in sheet form, such as provided by a sheet of plywood or of stiff aluminum alloy or the like which projects through a slot 56 formed in the respective side wall 57 of the top or cover 15 as indicated in Figs. 7 and 8, and from which it may be drawn to the canopy-forming position. At the outer edge of each extension 55 there is formed a roll holder 58 housing a spring roller or crank roller carrying a length of folded canvas piece 59 to provide a tent side wall when drawn down as indicated in Fig. 7.

For the purpose of providing further canopy extension, the under side of the swinging end of the top 15 houses within the space provided between the sides 57 another roller 60 (Figs. 1 and 7) carrying another folded canvas 62 which may be used as a shade section adapted to be extended rearward away from the structure and draped over the outer end or bail 63 of an extensible bracket 64 whose inner end may be hinged at 65 (Fig. 1), and when swung about the hinge 65 to the position of Fig. 7 will be retained in elevated position by means of hooks 66 or the like depending from the adjacent edge of the top 15 and rotatable through 90° arcs to and from bracket-engaging position.

For many camping purposes the roof or canopy provided by the top 15, the slide extensions 55, and the canvas strip 62 will be all that will be required. Under these conditions a table 70, separately illustrated in Fig. 6, will be swung down from within the housing 10 and between its side walls 33 to the operative position of Fig. 5, this being accomplished through the medium of pivots 71 between the inner ends of arms 72 at the inner end of the table 70 and the upper ends of standards 73 or the like carried by an internal transverse wall 74 in the housing 10. This table 70 is provided with a plurality of pockets as illustrated to receive various vessels or pieces of equipment against displacement during transport, such as bowls or serving dishes 75 and a gasoline stove 76 indicated in Fig. 5. These pockets are desirably rectangular and formed from upstanding wooden strips 77 or the like so that each pocket is open at one outer side but closed at its back and other sides. Some of these pockets may therefore be used to receive dinner plates and other ware, as well as the indicated vessels and equipment 75 and 76.

However, in this particular form where the table 70 is transported against the back wall 45 of the housing 10, a jointed bed structure 80 is pivoted outside of the table 70 by pivoting means 81, as seen in Fig. 4. Therefore, before the table 70 can be used, the bed structure 80 must be swung down to the position of Fig. 5 and swinging legs 82 braced by conventional jointed braces 83 be moved into the operative position illustrated. Here the bed structure, which is a folding structure, remains folded in Fig. 5 in the same relationship as in the transport position of Fig. 4. This bed structure 80 includes a lower frame 84 which carries the pivot means 81, and an overlying folded frame 85 hingedly connected to the lower frame 84 by a short middle frame section 86 pivoted to the adjacent ends of the frames 84 and 85. Between the frames 84 and 85 there is a folded mattress or bed pad 88 whose total length when unfolded is substantially the same as the total length of the combined frame elements 84, 85, 86, as illustrated in broken lines in Fig. 4 representing the operative horizontally aligned position of the bed structure 80 which is to be used as a bed. For this purpose the swinging end of the frame 85 is provided with other folding legs 82a braced similarly to the legs 82 by conventional jointed braces 83a.

With the disclosed arrangement, the table 70 remains in its upright stored position seen in Fig. 4 when the bed structure 80 is lowered for occupancy, whereas the bed structure 80 remains in folded relationship as seen in Fig. 5 when the table 70 is lowered into operative position where it is supported by the bed structure 80. The bed frame 84, 85, 86 may desirably be formed from aluminum alloy or angle iron and appropriate cross strips as preferred. In a desirable modification, the storage position of the table 70 and the bed structure 80 may be reversed, so that the bed structure remains elevated when the table is in use, in which case the legs 82 will be carried at the outer end of the table 70 somewhat as seen in Fig. 5A.

The present camping assembly, wherein the elongated housing 10 to be arranged in the position of Figs. 1, 4, 5 and 5A is employed and wherein the swinging table 70 and the swinging folded bed structure 80 are used, lends itself admirably to the provision of space for other camping facilities. Thus, the lower end of the housing 10 above the ground wheels 14 is conveniently bulged to provide the arrangement especially seen in Figs. 1, 4 and 5 where a water tank 90 is positioned in an enlarged storage chamber 92 immediately below the mentioned transverse wall 74. A water hose or pipe 93 having a faucet 94 leads from the tank 90 which may be placed under pressure for water discharge through the medium of a pump 95 which acts also as a stopper for a corresponding opening accessible from the left side of the housing 10 as viewed in Fig. 1.

Similarly, an ice box 96 (Fig. 4) is disposed at the opposite end of the chamber 92 behind a partition 97 at the right end of the chamber 92, this ice box being accessible through a door 98 seen at the right of Fig. 1. A lower cross wall 99 under the water tank 90 provides storage space in the mentioned chamber 92 to receive cartons, tent walls and the like. Spanning the lower part of the housing 10 below the cross wall 99 and immediately above the previously mentioned lower outer wall 54 is a lower extension of the chamber 92 which houses a transverse crank-operated roller or spring roller 100 for a floor canvas 102. Most of the length of such canvas may be wider than the length of the roller 100, its edge portions being folded inward to permit rolling up on the roller. The floor canvas 102, which may be a top floor, could commonly be drawn out and spread in the position seen in Fig. 4 before the bed 80 or table 70 is positioned. Below the roller 100, a second roller 104 may be mounted for receiving a folded canvas main floor or under floor 105 which may be drawn out to the position of Fig. 7.

For the purpose of providing and completing an enclosing tent structure, the two side walls 59 are drawn down from their positions in the roll holders 58 on the outer edges of the roof extensions 55 into positions to be attached to the outer or main floor 105 as best indicated in Fig. 7. Such attachment may be effected through the medium of any "zipper" or runner structure as indicated at 106. Since it is desired that the main floor 105 extend outward at least as far as the bracket 64 and the canvas shade section 62 carried thereby, it is important to have extensions of the side walls 59 to correspond therewith and to enclose the outer end of the bed structure 80. For this purpose wall extensions 108 folded about lines 109 are provided, these extensions 108 rolling up with the walls 59 to collapsed position in the roll holders 58 when folded over to permit such rolling. To complete the enclosure at the back of such tent, folded sections 108a folding about lines 109a are also provided. To complete the enclosure at the front of the tent, a tent front (Fig. 8) is provided by the folded canvas piece 62. The upper part of this tent front will overlie the bracket 64, side portions 110, when unfolded, being secured to the roof extensions 55 by means of conventional snap fasteners 112, its middle portion being brought in under the outer edge of the top 15 sufficiently to shed rain. The side edges of the tent front 62, 110 will be separably secured to the wall extensions 108 by zippers 114, the lower edge thereof being secured to the corresponding upper edge of the main floor 105 by zippers 115. As illustrated, the main floor canvas 105 is provided with upturned flanges 116 appropriately sealed at their corners to exclude the elements as indicated at 117, all these parts being folded over when this floor canvas is wound on the roller 104. If the inner or top floor canvas 102 is to be used along with the main floor 105, it may be rolled up on its roller 100 while the main floor 105 is being installed, and thereafter drawn out again to provide a wear member and protect the main floor 105. To anchor the inner edges of the rear extensions 108a of the side wall sections 59, such edges may be attached to the side walls 33 of the main housing 10 by other snap fasteners such as indicated at 118 in Fig. 7 which, as illustrated, are on the inner faces of the walls 33. Small openings remaining at the top of these lateral extensions 108a may be left open for ventilation, or closed in any manner.

With the arrangement described a space 120 is provided above the stored position of the table 70 and the bed structure 80 below the upper outwardly faced curved wall 52, this space conveniently having a bottom provided by a transverse horizontal wall 122 (Figs. 4 and 5). This makes a desirable storage space for additional canvas rolls (or for fishing poles or the like), and is accessible through a door 125 as seen in Figs. 2 and 3.

The camping unit provided by the above described housing 10 with its roof top or door 15, in addition to being mountable by the carrier structure 12 of Figs. 1, 2 and 3 on a passenger automobile having a body A, may also be mounted on the rear portion of a pick-up truck as seen in Figs. 9 and 10. This is accomplished by providing the inner walls of the sides 130 of the truck with channel guides 132 which receive slide rails 134 whose outer ends are pivoted at 135 on the side walls 33 of the housing 10. The housing structure and its contents are the same as with the form of Figs. 1 to 8. The slide rails 134 are shown as having on their inner ends flat depending check plates 136 which carry an underlying crossbar 137 whose extremities will engage stops 138 on the sides 130 of the truck below the channel guides 132, whereby to limit outward movement. When the housing 10 is moved from its transport position on the truck as seen in Fig. 9 to the upright or operating position as seen in Fig. 10, it may be braced in such upright position by means of brace arms 140 movably attached at their opposite ends to the side walls 33 of the housing 10 and to the slide rails 134. The crossbar 137 also serves as a rest for the housing 10 when it is swung to the transport position of Fig. 9. In order to permit each of the brace arms 140 to collapse, it may be of the jointed type providing a pivot at 141 movable slightly upward past dead center to a locking and bracing position and movable downward to collapsing position as the housing 10 is swung to the transport position of Fig. 9. With this arrangement the upper end of each brace arm 140 is pivoted at 142 to a bracket 143 secured to the back wall 45 of the housing 10 and the lower end of each brace arm 140 is pivoted by a shallow rivet 144 to the inside of the respective slide rail 134, the projection on the inside of the rail at this point being no greater than the projection of the check plates 136. Thus, as the body 10 swings down between the check plates 136, it will also swing between and clear the lower ends of the brace arms 140. It will be appreciated that the pivot connections 135 between the outer ends of the slide rails 134 and the side walls 33 of the housing 10 are so located with respect to the center of gravity of the housing 10 and its contents that the housing 10 may be readily swung about the pivot connections 135 between the upright operating position of Fig. 10 and the horizontal transport position of Fig. 9.

In setting up the described structures of this improvement, the movement of the device of Figs. 9 and 10 has just been outlined above. The opening of the top or roof 15 to camping position and the disposition of the contained equipment are the same as previously described for the form of Figs. 1 to 8.

As has previously been indicated with respect to the form of the camping outfit of Figs. 1 to 8, the housing 10 is readily swung down from the position of Fig. 2 through the position of Fig. 3 to the operating position of Fig. 1, the top or roof member 15 being raised to the broken-line position of Fig. 1, which is the position of Figs. 4 and 5, and the equipment then arranged as above described in connection with Figs. 4, 5 and 7 for camping.

To break camp, the equipment is restored to the described positions in the housing 10, much as illustrated in full lines in Fig. 4, and the roof member 15, upon breaking of the jointed brace arms 50, is moved to the closed position of Fig. 1. The lock pins 30 are now withdrawn to permit sliding movement of the sleeves 26 along the rearward sections of the main carrier arms 20.

The operator now applies a strong push to the upper part of the housing 10, as a consequence of which the upper part of the housing is thrown over to the broken-line position of Fig. 1, the sleeves 26 sliding to the dotted-line positions illustrated. The amount of movement of the sleeves 26 may of course be varied for different equipment, as a consequence of which the amount of tilt of the body 10 indicated by the broken lines of Fig. 1 may be varied for proper quick shift of the center of gravity. This new disposition of the center of gravity makes it possible for the operator now to lift the entire housing either by gripping the handles 53 of the cover 15, or by gripping the axle 14a carrying the ground wheels 14, as a consequence of which the housing 10 is readily swung up through the position of Fig. 3 and up to the transport position of Fig. 2, where it rests upon the cross rail 42, and the lock pins 30 are placed in the sleeves 26 in their newly attained transport position. If desired, the cable 40 previously indicated, running forward from the automobile, may be used as a means for pulling the structure over into transport position, or two operators may work together, one pushing and lifting the housing 10 and the other pulling on the cable 40.

If desired, upright tent poles 150 shown in Fig. 4 may be used for positive support of the outer end of the top or roof 15.

Again the brace arms 50 may be removably mounted at the indicated pivots at their opposite ends, as indicated in Fig. 5, as by notching them to pass over pivoting studs, and the same may be true of the brace arms 140 shown in Fig. 10. In the latter instances the arms may then be rigid arms without the joints, somewhat as indicated in Fig. 1A where a brace arm 50a is provided with notches 50b.

The form of the invention illustrated by Figs. 11 to 27 employs a short housing 210 as distinguished from the elongated housing 10 of the other forms, so that it may be easily disposed transversely on an automobile top and lowered to an operative position at the side of the automobile as indicated in Figs. 12 and 14 rather than at the rear. This housing 210 is mounted upon a rest or carrier rack structure generally indicated at 212 and including an extendible U-shaped rack bar 214 to receive the housing 210 as it is being lowered as in Fig. 12 (guide wheels 214a being included on this rack bar to assist the unloading as presently to be explained). The housing 210 includes a lid or cover 215 to close the housing 210 when being transported atop the automobile and to be opened through the medium of a piano hinge 215a (Fig. 15) to the roof-forming and tent-supporting position of Figs. 14 and 26.

Figure 18:
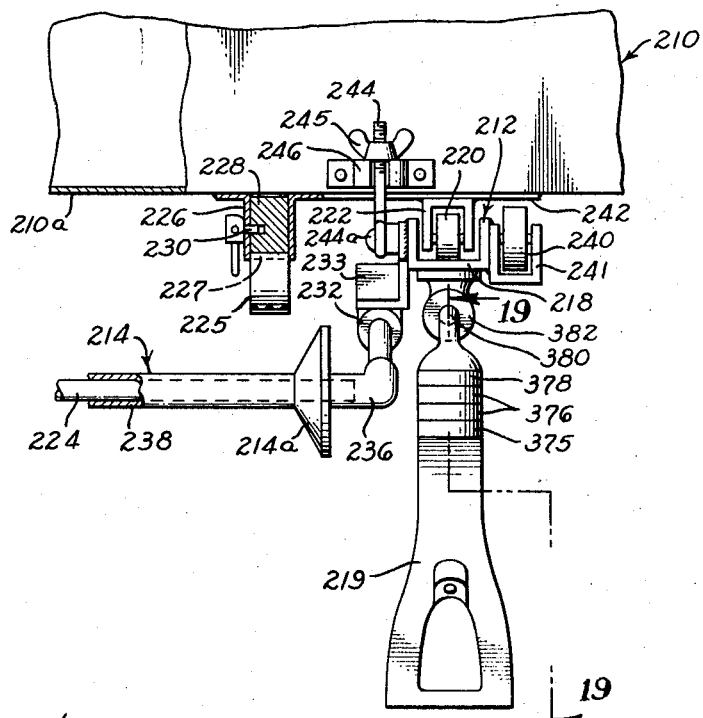
Fig. 18 is a lower end elevation indicated by the lines 18—18 of Figs. 11 and 15.
Figure 19:
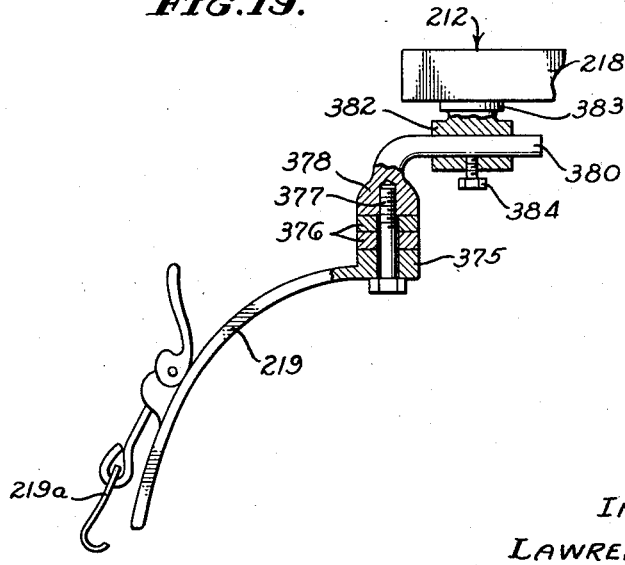
Fig. 19 is a fragmentary side elevation taken from the line 19—19 of Fig. 18.

The carrier rack structure or rest 212 includes two transverse upwardly faced channel tracks 218 whose opposite ends are mounted on the automobile top through the medium of partially conventional rain-gutter clamps 219 whose upper ends are attached to the under sides of the rails or tracks 218 as best indicated in Figs. 18 and 19 and more fully described hereinafter. Upon the bottom walls of each of the channel tracks 218 there runs a plurality of rollers or wheels 220 whose axles are secured at spaced distances along and between the depending flanges of downwardly faced positioning and supporting channels 222 appropriately secured to the outside of the back wall 210a of the housing 210. By these means the housing 210 is rolled to and fro across the top of the automobile between the position of Fig. 11 and the position of Fig. 12. The object of this movement in the unloading operation for the purpose of setting up camp is to move the housing 210 to a position such as seen in Fig. 12 where the housing is suspended and balanced on the cross arm or bight 224 of the U-shaped rack bar 214. Such swinging to suspended position is accomplished through the means of a hook 225 on the back of the housing 210 near each channel 222. In practice each hook is adjustably carried in an upwardly faced channel bar 226 secured to the back of the housing 210 and therefore closed by such back. The purpose of such adjustment is to position the hooks 225 transversely of the housing back at the proper distance along the housing for proper balancing of the load of the filled housing for ease of swinging movement of the housing when in the pivoting or swinging position of Fig. 12, and also to get it into proper position with respect to the ground level when rested thereon. The hook adjustment is accomplished by projecting each hook through a slot 227 in the bottom wall of the respective channel bar 226, the slot being long enough for maximum adjustment, and affixing the hook to a slide bar 228 within the respective channel bar 226, the slide bar being long enough for its ends always to extend beyond the ends of the slot 227. Fixing of the adjustment may be accomplished by set screws or preferably by spring-loaded pull pins 230 of conventional design, as seen in Figs. 16, 18 and 20.

In order to position the cross arm or bight 224 of the extensible U-shaped rack bar 214 in proper position for the indicated unloading operation of Fig. 12, the opposed side arms of the rack bar 214 are slidably mounted in positioning guides 232 carried below the level of the channel tracks 218 on the under sides of brackets 233 secured at a downward inclination to the adjacent sides of the channel tracks 218. Thus, by withdrawing the rack bar 214 outward, its cross arm 224 and guide wheels 214a are disposed lower as they move farther out. Usually the amount of the extension is constant for a given automobile, and such extension may thus be limited by stop rings 234 (Fig. 15). Retention of the rack bar in transport position may be effected by stop screws 235 in the guides 232. As shown, the guide wheels 214a are beveled to frusto-conical shape to engage alongside the adjacent side wall of the hook-carrying channel bars 226. These guide wheels 214a are quite important to maintain good alignment of the housing 210 as it moves onto the cross arm 224 for engagement of the hooks 225 therewith. By proper adjustment of the hooks 225 and the outward position of the cross arm 224 with respect to the location of the load in the housing 210, the loaded housing is nicely balanced on the extended rack bar 214 and its cross arm 224, so that the effective weight to be handled by the operator may be only about 20 pounds, for example. The positions of the guide wheels 214a are maintained against lateral outward movement by bearing against the adjacent ends of L's 236 which connect the side arms of the rack bar 214 with the ends of the cross arm 224, and movement of the wheels 214a inward on the arm 224 is prevented as by a spaced sleeve or sleeves 238 which may carry the wheels 214a and are disposed on the arm 224.

Another feature in convenient handling of the housing 210 as it is drawn outward for engagement of the hooks 225 with the rack arm bar 224 is a forward roller 240 at the outer end of each channel track 218 somewhat beyond the end of such track 218. Such rollers 240 are needed to take over and support the housing 210 after the rollers 220 leave channel tracks 218. So that the rollers 220 will clear the rollers 240 as the former leave the tracks 218, the rollers 240 are mounted in U-shaped brackets 241 fixed (see Fig. 18) on the outer side walls of the respective tracks 218, such brackets projecting adequately forward for proper location of the rollers 240, as seen in Fig. 15. Rather than to run the rollers 240 directly on the back wall 210a of the housing 210 it may be desirable to provide a bearing plate on such back wall as indicated at 242 in Fig. 18; such plate 242 may, in each instance, be an extension of the respective mounting flange of the nearest channel bar 226 and extend across under the respective channel 222 carrying the rollers 220. Such extended flange plate 242 will also provide a bearing for the guide wheels 214a when necessary.

Since it is necessary to tie down the housing 210 on the carrier rack structure 212 during transport on the top of the automobile, provision is made for this purpose, at the forward or outer end of the housing 210 and the adjacent ends of the channel tracks 218, in the form of swing bolts 244 pivoted at 244a to the adjacent sides of the respective channel tracks 218 and having at their outer ends wing nuts 245 or the like to bind against the upper sides of U-brackets or gunnel locks 246 bolted (see especially Figs. 15 and 18) to the adjacent bottom portions of the housing 210 adjacent the back wall 210a thereof. The thumb nuts are loosened and the bolts 244 swung out from the brackets 246 when the housing is to be lowered to camping position. To anchor the opposite end of the housing 210 in transport position, an angle bar 248 (Fig. 15) is disposed between and secured to the two channel tracks 218 to stabilize the carrier rack structure 212, and also to carry two rigidly mounted, forwardly extending finger clips or lugs 250 which, as shown in Fig. 16, project into the ends of the closed channel bars 226 and overlie the adjacent end portions of the bottom walls of such channel bars 226 when the housing 210 has been rolled back to its transport position on the channel tracks 218. This arrangement seves as a lock or stop which prevents the housing from rolling farther along the tracks 218 and also prevents the top of the housing 210 from moving upward during transport.

*Setting up camp*

Assuming the U-shaped rack bar 214 and its cross arm 224 to have been drawn out, and the housing 210 to have been released from the locking swing bolts 244 and drawn out to the position of Fig. 12, where the hooks 225 engage the cross arm 224 of the U-shaped rack bar 214, the body 210 is now suspended from such rack bar and arm and is then swung to the vertical position of Fig. 14. To space the lower portion of the housing 210 from the automobile in such vertical position, a swinging U-shaped spacer 252 is swung out from a collapsed position between tapered forward ends of the hook-carrying channel bars 226, as seen in Figs. 12 and 12A, to which the spacer is pivoted at 252a. The cross arm of the spacer 252 is desirably provided with a rubber bumper sleeve 253 to bear against the adjacent side portion of the automobile body. If camp is to be only temporary and a tent not needed, the housing 210 is left suspended from the projected rack bar 214 and its cross arm 224 by means of the hooks 225 engaged with the latter.

Under these conditions, the lid or cover 215 of the housing 210 is opened at its lower end and raised to the horizontal position seen in Fig. 14, such lid being then locked in elevated position by jointed or jack-knife braces 255 whose upper ends are pivoted to the outer faces of side rails 256 and whose lower and inner ends are pivoted on bracing webs 257 mounted vertically along the back wall 210a of the housing. Folding chairs and stools may now be brought out for a resting interval. If the preparation of food is required, a combination table and galley 260 is folded down into the position seen in Figs. 14 and 26. This galley table, which is shown in more detail in Fig. 24, may include a gasoline stove 261 and a plastic dishpan 262 on one side, dining areas 263 on the other side separated by a dividing wall 264 which supports the middle of a top member 265 providing carrying spaces thereunder at the backs of the dining areas, and a removable cover 266 for the areas 263, this cover 266 being invertible and mountable in the position shown in Fig. 24, at the outer end of the galley proper to provide additional dining areas. Hinged trap doors 267 at the far side of top member 265 provide under them pockets for spice cans and other small food receptacles. The end walls of the cover 266 are tapered to slide up on correspondingly tapered guides 268a on the inner sides of end walls 268 of the galley table and under flanges 269 at the top edges thereof. When slid up into such position, the cover 266 is there retained by means of two-part latches 270 often referred to as suit-case latches, one part of each latch being on the narrow side of the cover and the other part on the near edge of the top member 265. Similarly, a flange 269a on the wide side of the cover and the flange 269 of the near end wall 268 of the galley table are provided with two-part suit-case latches 270a to lock the cover in the illustrated dining position where its wide wall rests upon a ledge 271 flush with the bottom 272 of the table. Pivotally mounted on the under side of the bottom 272 of the table adjacent its forward edge is a pair of folding supporting legs 274 braced or retained in open or operative position by any appropriate means.

The back lower edge or corner of the table 260 formed by the junction of the table bottom 272 and the back vertical wall 268 is hinged to the inside bottom wall of the housing 210 as by piano hinges 275, or the like, at a position far enough back to allow closing of the housing lid 215. Since the table is only four or five inches thick when folded and the housing has a depth of around ten inches, ample space is provided behind the folded table when in stored position to store many items such as folding beds, chairs and the like. The ends of the housing are rounded out beyond the sides of the lid 215 at 276 to provide semi-cylindrical vertical storage spaces for bedding, a tent or the like; and by making the table narrower than the lid 215 at one side, additional storage space is made available. In addition, as seen at the top of Fig. 14, an elongated water tank 277 is horizontally located, this tank having at its bottom a hose 278 with a faucet and at its top an external capped filling neck 279 (Fig. 15).

If camp is to be relatively permanent so as to require use of a tent T such as seen in Figs. 25 and 26 and as indicated in broken lines in Fig. 14, and especially if use of the automobile is required while camp is still set up, then use of a pair of legs 280 is called for to support the housing 210 in the position illustrated in Figs. 14 and 26. These legs 280 telescope up into guide tubes 282 located in forward portions of the semi-cylindrical sides 276 of the housing 210, and are retained either in extended operative position or in stored position by spring-loaded pull pins or bolts 283 to enter holes 283a, as best indicated in Figs. 13, 15 and 17. The pins 283 are shown as co-operating with flanged hubs 284 attached to the bottom of the housing 210 and may themselves be attached either to such flanges or to the bottom of the housing. Preferably the lower ends of the legs 280 are connected to the ends of a horizontal tube 285 by L's 286, the ends of the tube 285 carrying ground rollers 287 which bear at their outer sides against the adjacent ends of the respective L's 286, and are adapted to be forced against such L ends by locking cams 288 pivoted on brackets or the like 289 (best shown in Fig. 13A) fixed on the tube 285, whereby to lock the rollers against turning movement when required.

In order to brace the housing 210 in upright position independently of the automobile on which it is transported, so that the automobile may be used for side trips while camp is still set up, telescoping brace legs 290 are provided, these having their upper ends pivotally mounted at 291a in pocket brackets 291 on the back wall 210a outside the roller-carrying channels 222 but between the semi-cylindrical side portions 276 of the housing 210, as shown in Figs. 12 and 13. Spring snap clips 292 on the lower portion of the back wall 210a serve to retain the lower ends of the legs 290 in stored position when telescoped. It will be noted that the pockets of the brackets are wedge-shaped so that the lower outer edges of the brackets serve as stops to limit the outward bracing movement of the brace legs 290 (in much the same way that outward swinging movement of the table legs 274 may be limited).

When it is desired to detach the hooks 225 on the back of the housing from their positions on the cross arm 224 of the extended U-shaped rack bar 214, this detachment is easily accomplished by pulling the legs 280 out at an angle (not so pronounced as in Fig. 12) until the ground rollers 287 contact the ground, or the tent floor if in position. The brace legs 290 are then extended and moved out to a suitable bracing location. Thereupon, the lower ends of the legs 280 and the connecting tubes 285 are pushed back toward the automobile, the rollers 287 travelling along the tent floor or ground, until the legs 280 and the housing 210 are in vertical position. By reason of the initial inclination of the legs 280, the housing 210 will have been raised and the hooks 225 will have cleared the cross arm 224 when the vertical position has been reached. Or, a slighter inclination of the legs 290 may be used to reduce the amount of movement of the rollers 287 and the legs to vertical position. In either case the adjustment of the extension is maintained by inserting the lock pins 283 in appropriate holes 283a in the legs. In the latter instance, the hooks 225 are lifted only enough to take the load off the arm 224. The lock spring pins 230 are then withdrawn from the hook-carrying slide bars 228 so that they and their hooks 225 may be elevated to clear the arm 224. The automobile may now be driven away and the brace legs 290 adjusted to an optimum position if required, the rollers 287 having been locked by their cam locks 288.

Where the mentioned tent T of Figs. 14, 25 and 26 is used, it is desirable that it be much larger than the size of the housing lid 215. For this purpose the lid 215 is provided with telescopic tent supports to be drawn out at both sides and the front of the elevated lid to assume the extended positions shown in Fig. 14. These supports include a laterally extendible U-frame 300 for each side and a forwardly extendible U-frame 302 for the front. Each frame 300 has telescoping side arms 301 and a tubular outer arm 300a. The forward frame 302 has telescoping side arms 303 and a tubular outer arm 302a. Each outer arm 300a and both ends of arm 302a telescopically receive extendible bars 304 and 305 respectively, the ends of each pair of bars 304 and 305 being aligned to meet and form a corner where they are connected against relative movement by an L plug 306 best seen in Fig. 14A.

In order to provide a support for the extension frames 300 and 302 additional to the support of the lid 215 by its braces 255, the opposite ends of the outer arm 302a of the frame 302 are provided with downwardly directed tent-pole-receiving sockets 308 adjacent their connections with the side arms 303. These sockets 308 may be downwardly directed T's anchored on the arm 302a, and preferably the downwardly directed portions are disposed at a laterally directed angle rather than a true 90° angle so that telescopic legs or tent poles 310, whose upper ends are received in the resultant sockets of the T's, will flare laterally outward as they extend downward as seen in Fig. 14. Thus, the poles or legs 310 support and stabilize the tent-supporting frame structure provided by the side frames 300, the forward frame 302 and the connected extendible bars 304 and 305.

The joining of the arms of the frame 302 is accomplished by T's 312 in which the outer ends of the side arms 303 and the ends of the front outer arm 302a are fixed. Similarly, the joining of the forward side arm 301 of each frame 300 to its outer arm 300a is accomplished by a T 313, while the joint of the rearward side arm 301 is accomplished by an L 314. The T's 312 and 313 permit the sliding passage of the telescopic bars 304 and 305 to form the forward corners of the resultant tent-supporting frame structure.

The mounting of the telescoping side arms 301 and 303 of the U-frames 300 and 302 in the lid 215 is effected through the medium of square passages in the rails 256 mounted on the under side at the respective edges of the lid 215. As seen especially in Fig. 23, each edge of the lid 215 is bent or folded to form a square or box-like edge portion 315. Along the front edge of the lid and within such box-like portion 315, a rail in the form of a special aluminum shape or extrusion 316 is secured, this extrusion 316 providing, when the lid is in its open position, two lower square channels 317 which respectively receive the two forward arms 301 of the oppositely operating U-frames 300. A similar rail extrusion is provided at the hinged edge of lid 215 for the rear arms 301. Along the sides of the lid 215 within the respective box-like edge portions 315, there are mounted the previously mentioned side rails 256 in the form of shapes or extrusions 318, each having a square channel section 319 which receives the respective side arm 303 of the forward U-frame 302, such channel 319 lying below the level of the channels 317 for the arms 301.

With the sliding or telescopic constructions described, the tent-supporting U-frames 300 and 302 are easily withdrawn merely by grasping and pulling outward the outer arms 300a and 302a, the tubular telescoping bars 304 and 305 being then withdrawn from the telescoping positions in the arms 300a and 302a and connected at their extremities by inserting the ends of the L plugs 306. Commonly the envelope type tent T is positioned over the top of the housing 210 and under the legs 280 and their rollers 287 before the lid 215 is raised. After raising the lid, which lifts the tent top, the U-frames 300 and 302 are then drawn out, and the telescoping bars 304 and 305 and telescopic legs or tent poles 310 thereafter positioned, as in Fig. 14.

In order to provide a ridge in the tent top for better shedding of rain, it is desirable to provide an elongated U-shaped ridge pole 320 indicated in Fig. 27 which is mounted in upstanding position by inserting its extremities in eyes 322 secured to the outwardly facing wall of the respective box-like edge portion 315 of the housing lid 215. When the lid is closed, its outer edge portion extends flush with or slightly beyond the bottom of the housing 210, as seen in Fig. 15, thus providing for projection of the eyes 322. Such disposition also makes provision for externally mounted two-part suitcase latches 323 or the like (Fig. 17) by which the swinging end of the lid 215 is secured to the bottom of the housing 210 for transport.

Tent assembly

The tent structure T, which is of any usual or preferred flexible material, such as canvas or the like, is probably best indicated in Fig. 25 where it is shown in an expanded or set-up condition but without the showing of supports, and its relationship to the set-up housing 210 for camping purposes is probably best indicated in Fig. 26, its general relation to the housing being also indicated in broken lines in the perspective view of Fig. 14.

The side elevation of Fig. 25 shows a near side wall 350, a front end wall 352, and a portion of a far side wall 353 disclosed by breaking away a portion of the near side wall 350. The lower and forward end edges of the side walls 350 and 353 are shown as being detachably connected to the front end wall 352 and a floor 354 by conventional slide or "zipper" fasteners 355. Such fasteners may be separated at the forward end to provide an entrance opening as seen in Figs. 14 and 25, and also at the bottom to form a fly of either side wall so that it may be thrown back over the top 356 of the tent. Suitable screened windows 357, with cover flaps, may be provided as desired. The top 356 may be continuous with the end wall 352 and with the side walls 350 and 353. Also, the top 356 is continuous with an upper rear end flap 358 provided with snap fasteners 358a for attachment to the upper portion of the back wall 210a of the housing 210. Further, the end wall 352 may be continuous with the floor 354, and the floor 354 is continuous with an upturned rear end flap 360 that may be snapped by snap fasteners 360a to the bottom of the housing 210 as seen in Fig. 26. Each side wall 350 and 353 is provided with an end flap 362 having snap fasteners 362a to snap to the back of the housing 210 near its sides. The lower portions of the flaps 362 may be connected with the sides of the bottom flap 360 by slide fasteners 363.

The described tent structure, when the sides 350 and 353 are connected by the slide fasteners to the end wall 352 and the bottom 354, thus becomes an envelope which may be slipped over the lid 215 before the poles 310 are installed and the table 260 lowered, and preferably with the housing legs 280 elevated. However, a convenient procedure is to snap the upper back flap 358 to the back of the housing 210 when the latter is in a lowered or partly lowered position such as in Fig. 12, with the tent spread out forward, and then enter under the tent, raise the lid 215, extend the U-frames 300 and 302, and position the poles 310.

The operation of detaching the housing 210 from the U-shaped rack bar 214, 224 and bracing it with the telescopic legs 290 has been described above. The table legs 274 are desirably pivoted in pocket mountings 370 similar to the pocket mountings 291 for the brace legs 290, the mountings 370 having, however, elongated pockets which permit the legs 274 to swing forward to an angular bracing position before their further movement is limited by striking the forward edges of the pocket walls, as indicated in Fig. 14.

General

Breaking camp is in general a reversal of the setting-up operations, and when the closed housing 210 is moved up into the flat position of Figs. 11, 15, 17 and 18, the swing bolts 244 on the forward ends of the channel tracks 218 of the carrier rack structure 212 are swung up into the gunnel locks 246 and locked therein by the wing nuts 245, to secure the housing along with the clips 250.

In order that the carrier rack structure 212 may be properly set and spaced on the top of any automobile regardless of varying heights of the extreme top portions above the rain gutters on which the gutter clamps 219 are mounted, and regardless of the angle of the gutters at the mounting points, these gutter clamps are specially constructed and mounted as shown in Figs. 18 and 19. The main gutter clamp arm 219 and the clamp portion 219a at its lower end are conventional, but the upper end is provided with a seat 375 for a plurality of height-adjusting washers 376 which are maintained in assembled relation as by a bolt 377 which is threaded up into a head 378. The bolt 377 is cut to proper length for the particular installation, thereby avoiding possible injury to the automobile top which might result from a projecting bolt end where fewer washers 376 are required. The top of the head 378 is provided with a horizontally projecting mounting finger 380 that is rotatably received in a horizontal bore in an elongated positioning sleeve 382 provided on its upper side with a flange 383 attached to the under side of the respective channel track 218. Thus, during installation the finger 380 will rotate in the sleeve 382 where necessary to accommodate any angularity in the positioning of the clamp parts occasioned by angularity of the portion of the rain gutter to which the clamp is attached. A set screw or the like 384 is then tightened to maintain the adjusted relation.

With the desired structures, the carrier rack 212 is quickly attached by the gutter clamps 219 to the rain gutter at proper elevation from the automobile top. The housing 210 is easily drawn to the tilted position of Fig. 12 and swung on the extended U-shaped rack bar 214 by the hooks 225 which have been adjusted to balance the load of the housing 210. Thereupon the housing is lowered and set up in camping position as above described.

Figure 13A:
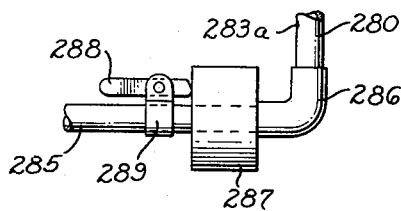
Fig. 13A is a fragmentary detail of a ground roller.

When the housing 210 has been unloaded to the position of Fig. 13, where it is supported on its legs 280 and ground rollers 287 and is braced by the telescopic braces 290, it is ready either for opening and setting up camp, or for rolling against a garage wall for storage. In either event, the locking cams of Fig. 13A are moved to locking position against sides of the rollers 287 to prevent unwanted movement.

Since all of the metal parts are made of aluminum or aluminum alloy, the structure itself is relatively light in weight. Metal is of course used for the housing 210, the legs and braces, the lid 215, the galley table 260, the extensible tent-supporting frames, and the carrier rack and mounting means. Handling of the structure is therefore easy, especially since the loaded housing 210 is capable of nice balancing on the extended U-shaped rack bar 214 which carries the load by its cross arm 224 and the hooks 225 on the back of the housing. The housing 210 may be withdrawn from its position on the carrier rack structure 212 and manipulated down into suspended position by using the cross bar 285 between the legs 280 as a handle. For this purpose, the bar 285 and the legs 280 are drawn out to a partly extended position in which they are locked by inserting their locking pull pins 283 in intermediate holes 283a in the legs. To rest the housing on the legs 280, the latter may then be released from the pins 283, and pulled farther down as previously described, whereupon the legs 280 are locked in supporting position by inserting the pins 283 in other holes 283a.

It is to be noted that at least one dimension of each of the housings 10 and 210 is such as to approximate and be confined generally within the width of the top of the automobile body.

The invention claimed is:

1. In combination: a housing having a width, a length and a depth forming a chamber to house champing equipment and the like, said depth being shallow relative to said width and length, said housing being adapted to be received in flat relationship upon the top of an automobile in transport position approximately within the width of said top, said housing being movable between a flat transport position on said top and a vertical supported camping position adjacent said automobile; a lid hinged at one end to the top of said housing as the latter stands in said vertical position, said lid being elevatable to a horizontal position with respect to the vertical housing to form a roof section, such roof extending outward from and beyond said housing; means to hold said lid in said elevated horizontal position with respect to the vertical housing; means disposed on said lid and extensible therefrom into horizontal position to expand said roof section and support tent means, and returnable to said lid for transport; and means on said lid supporting said extensible means in extended horizontal position and in retracted transport position.

2. A combination as in claim 1 wherein said extensible means is slidably mounted in said lid.

3. A combination as in claim 2 wherein said extensible means is a frame slidable from said lid for mounting said tent means thereon in slidably extended position.

4. A combination as in claim 1 wherein said extensible means is a frame structure on which said tent means is supportable when extended to said horizontal position.

5. A combination as in claim 1 wherein said extensible means on said lid is frame means for supporting said tent means when extended, and pole means is removably attached to an extended portion of said frame means to support the latter in its extended position.

6. A combination as in claim 5 wherein said extensible frame means is slidable to and from said lid.

7. A combination as in claim 1 including rack frame means to be mounted on an automobile carrying said housing for moving said housing between said flat position on said top and said vertical position, said rack frame means including means for positioning said housing in said vertical position and including means for positioning said housing on said automobile top.

8. A combination as in claim 7 wherein said rack frame means includes: rail members securable to said top to guide said housing into flat supported position thereon, and said housing has means on its back to ride along said rail members; extensible bar means carried by said rail members and movable to a position beyond the edge of said top; and cooperating means on the back of said housing to engage and swing upon said bar means for supporting said housing and swinging it from the top of the automobile to a vertical position at a side thereof.

9. A combination as in claim 8 wherein said cooperating means are of hook construction to hang on said extensible bar means.

10. A combination as in claim 1 including rack means for mounting on an automobile top carrying said housing and for receiving said housing in said flat position.

11. In combination: an automobile body having a top; a shallow housing to be borne on top of the automobile body and having width and length of dimensions to be confined approximately within the limits of said top when in a flat position upon said top, said housing thus providing a chamber for reception of camping equipment; means mounting said housing on said automobile top to move the housing between said flat position on the top of said body and a vertical position adjacent the automobile body, such mounting means including means positioning and supporting said housing in such vertical position; a lid closing one side of said housing when atop said body and hinged across the upper end of said housing when in vertical position, said lid being elevatable to horizontal position when said body is in vertical position to provide a roof area in front of the open housing; and means movably carried by said lid and extensible horizontally from said lid when in horizontal position to provide supported means extending from said roof area.

12. A combination as in claim 11 wherein said horizontally extensible means includes frame means slidable in said lid into a position to support flexible tent means in roof-forming position.

13. In combination: an automobile having a top; a shallow housing which is shallow relative to its width and length dimensions, one of said dimensions approximating the width of said top so that said housing may lie approximately between the side edges of said top and in a flat position, said housing providing an equipment chamber; means for mountnig said housing atop said automobile in said flat position for movement of said housing from said flat position to a vertical position adjacent said automobile, such mounting means including means for positioning and supporting said housing in such vertical position; a lid swingingly mounted on said housing to close said chamber when in said flat position on said automobile top and mounted across the upper end of said chamber and housing when in vertical position, said lid being elevatable to horizontal position in front of said housing when in said vertical position to provide a roof section above an area immediately in front of the open housing; and means to maintain said lid in said horizontal open position when swung up thereto.

14. A combination as in claim 13 including frame means horizontally slidable in said lid when in said horizontal position for extension of said roof section.

15. A combination as in claim 14 including flexible tent means for support by said slidable frame means when in said extended horizontal position.

16. A combination as in claim 13 wherein said mounting means includes rail means fixed on said top to support said housing and also includes bar means extending beyond said rail means, said housing having means for swingingly engaging said bar means and positioning said housing in hanging position alongside said automobile.

17. A combination as in claim 16 wherein said means engaging said bar means are hook-like means, said housing having legs extensible from the lower end thereof when in vertical position, said legs having ground engaging means and being long enough for said ground engaging means to engage the ground in front of said housing when suspended by said hook-like means at an inclination from the vertical, whereby said legs at their lower ends may be pushed along the ground to move them and said housing to the vertical for lifting said hook-like means from said bar means to detach the housing from said automobile.

18. A combination as in claim 17 wherein ground-engaging bracing means are connected to the back of said housing for bracing the latter in upright position when said hook-like means are disconnected from said bar means.

19. In combination: a housing providing a chamber for receiving camping equipment and the like and having a back wall adapted to rest upon a carrier atop an automobile body, the housing being adapted to move from a flat position atop said body to a vertical position adjacent said body, said housing being narrow enough in one dimension to be disposed approximately within the side edges of the automobile top when in said flat position; means for mounting said housing atop said automobile body and for moving said housing therefrom to said vertical position adjacent said automobile; a lid swingingly mounted at the top of said housing in said vertical position and opposite said back wall, and movable to a horizontal position forward of said housing in said vertical position to form a roof section; and a table-like structure hingedly mounted in the lower portion of said housing behind said lid when closed and swingable out to horizontal operative position when said lid is raised to roof-forming horizontal position.

20. A combination as in claim 19 including extensible frame means mounted in said lid to be extended horizontally outward from said lid when in said horizontal roof-forming position for supporting tent means thereon.

21. In combination: a housing containing a chamber for storing camping equipment and the like in transport and having a back wall adapted to be borne on rest means atop an automobile body in a flat position, the housing being narrow enough in one dimension to lie approximately within the side edges of the automobile top in said flat position; mounting means for moving said housing between said flat position atop said automobile body and a vertical position alongside said body; a lid swingingly mounted at the top of said housing when in said vertical position and movable about such mounting to a horizontal position forward of said housing for forming a roof section; and means for maintaining said lid in elevated horizontal position, said mounting means including carrier rest means to be secured to said automobile top, bar means at one side of said top for suspending said housing alongside said body in vertical position, means on said housing for moving the same horizontally along said carrier rest means, and hanging means on said housing to engage said bar means for swinging and suspending said housing.

22. A combination as in claim 21 wherein said suspending means is detachably engageable with said bar means, and said housing has leg means extendible from the lower end of said housing in vertical position to support said housing, said leg means having ground engaging means, said leg means being long enough to extend forward of said housing to engage the ground with said leg means and housing in an inclined position, thereby providing for pushing said ground-engaging means, leg means and housing to an upright position and lift said detachable suspending means from said bar means.

23. A combination as in claim 22 including bracing means on said back wall to brace said housing in upright position when supported on said extended leg means.

24. In combination: an automobile body having a top and upstanding walls; horizontally disposed rest means mounted upon said top; a flat housing for camping equipment adapted to overlie said top in a horizontal transport position and having a back wall to bear upon said rest means, said housing being mounted to swing from said rest means to stand in a vertical position adjacent one of said upstanding automobile walls; co-operating carrier rack means on said housing and automobile body for mounting the housing on said body and including pivot means for swinging the housing between said horizontal transport position and said vertical position; supporting means on the lower end of said housing when in vertical position to rest the housing on a support; and means on said carrier rack means and housing for movably engaging said back wall of said housing with said rest means.

25. A combination as in claim 24 including a roof member hinged at one end on said housing and serving as a top and roof for said housing when in said horizontal position and, when said housing is in said vertical position, to be opened and raised to a horizontal roof-forming position forward of the vertical housing.

26. A combination as in claim 24 wherein said carrier rack means has side supporting arms having swinging connections at their outer ends with said back wall adjacent side portions of said housing to position said housing.

27. A combination as in claim 26 wherein said outer ends of said supporting rack arms are pivoted to said back wall adjacent the middle of said housing to balance the latter on said pivot means.

28. A combination as in claim 24 wherein said housing is detachable from said body, and means is connected to said back wall to brace said housing in vertical position independently of said automobile body.

29. In combination: a flat housing adapted to contain camping equipment; carrying means attached to said housing for connection to an automobile and for movement thereon of said housing between a horizontal position on the roof of the automobile and a vertical operative position adjacent said automobile; and a combined roof-and-door member hingedly mounted on one end of said housing to close said housing and to be raised to a horizontal position when said housing is in vertical position to serve as an outwardly extending roof.

30. A combination as in claim 29 wherein said roof-and-door member houses movable extension elements to be drawn horizontally outward when said roof-and-door member is raised and form extensions from said roof.

31. In combination: an automobile body having a top and upright walls; a flat housing for camping equipment adapted to overlie said top in a horizontal position and to be moved from such horizontal position to stand in a vertical position adjacent an upright wall of said automobile body, one dimension of said housing approaching the width of said automobile body; carrier means on said body to carry said housing between said horizontal and vertical positions; a roof member hinged at one end on said housing to serve as a top and roof for said housing when the housing is in horizontal position, and to be opened and raised to a horizontal roof-forming position when said housing is in vertical position; and camping equipment carried in said housing.

32. A combination as in claim 31 wherein said roof member houses movable extension elements to be drawn out to horizontal tent-supporting position.

33. In combination: an automobile body having a top and a rear end; an elongated housing for camping equipment adapted to overlie said top in a horizontal transport position and to stand vertically on a bottom end thereof and at the rear end of said body and transversely thereof in an operating position, the width of said housing approximating the width of said body; a carrier rack including side supporting arms having ends thereof pivoted at side portions of said rear end of said body, opposite ends of said side arms being pivotally mounted on said housing at the bottom end thereof; and positioning arms mounted on and extending angularly from said side arms to an intermediate portion of said housing and pivotally connected thereto to position said housing in a vertical operating position and in a horizontal transport position when swung over the top of said automobile body.

34. In combination: a housing containing a chamber for storing camping equipment and the like in transport atop an automobile and having a back wall to bear upon rest means on an automobile top in a flat position; mounting means for moving said housing between said flat position atop the automobile and a vertical position alongside said automobile; carrier rest means to be secured to said automobile top; bar means at one side of said rest means for suspending said housing in a vertical position from said automobile through said carrier rest means; means on said housing for moving the latter horizontally on said carrier rest means; and hanging means on said housing to engage said bar means for swinging and suspending said housing on said bar means.

35. A combination as in claim 34 wherein said bar means is laterally extensible from one side of said carrier rest means to dispose said housing at one side of said automobile in suspended vertical position.

36. A combination as in claim 34 including means for supporting said housing on the ground and for raising said hanging means to detach them from said bar means.

References Cited in the file of this patent
UNITED STATES PATENTS

| | | |
|---|---|---|
| 1,178,734 | Krause | Apr. 11, 1916 |
| 1,508,065 | Ramsdell | Sept. 9, 1924 |
| 1,834,489 | Hauber | Dec. 1, 1931 |
| 2,378,448 | Thompson | June 19, 1945 |
| 2,533,683 | Neuhaus | Dec. 12, 1950 |